June 25, 1929.                  B. H. ANIBAL                     1,718,207
                               TORSION BALANCER
                              Filed April 2, 1928
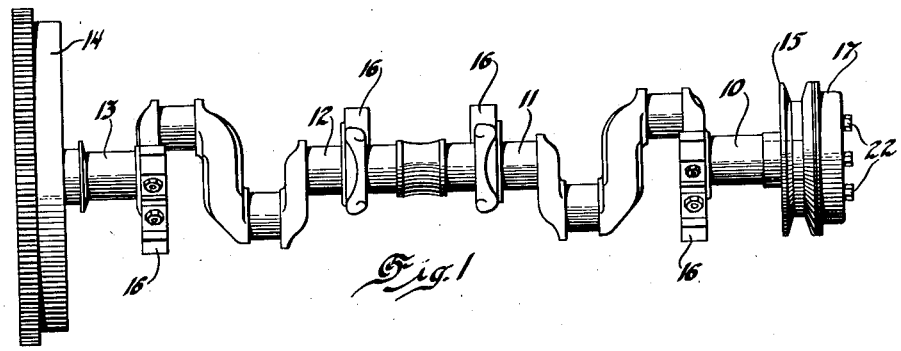
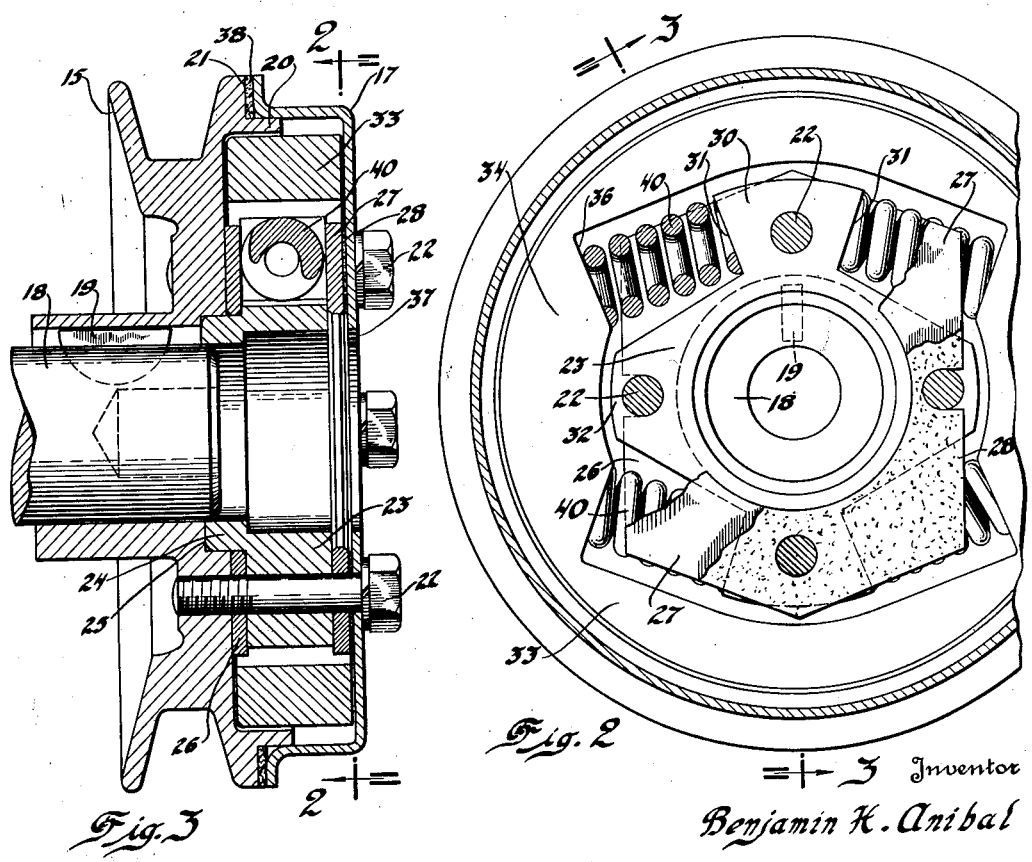
Inventor
Benjamin H. Anibal
By Blackmore, Spencer & Hulse
Attorneys Patented June 25, 1929.

1,718,207

UNITED STATES PATENT OFFICE.

BENJAMIN H. ANIBAL, OF PONTIAC, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TORSION BALANCER.

Application filed April 2, 1928. Serial No. 266,673.

This invention relates to means for minimizing torsional vibrations in shafts of engines or other machines.

When a shaft is elastic and has at one end a mass with a comparatively large amount of inertia, such as a flywheel (as in the case of internal combustion motor vehicle engines), the shaft assembly has a particular torsional frequency of its own. Any periodical variation of torque applied to the shaft (as by the pistons) in harmony with its frequency will set up torsional vibrations due to resonance. If these torsional vibrations are not curbed, disagreeable or serious results my occur owing to the violence of vibration during periods of resonance.

It is an object of this invention to minimize torsional vibrations of a shaft due to resonance by providing a mass attached to the shaft elastically and having substantially no rubbing engagement with it or its rigidly attached accessories; and to accomplish this by means of an attachment applicable to any form of shaft and requiring no modifications in the balance of the shaft.

The invention consists in the peculiar combination of a shaft with a torsion balancer comprising a mass balanced and having a moment of inertia about the axis of the shaft and supported substantially out of rubbing contact with it and its fixtures by springs. It also consists in a torsion balancer comprising a ring-like mass balanced and having a moment of inertia about the axis of the shaft and a spring connection between the mass and a disc or other member centered on the shaft and rigid with it, also in the combination of a fan pulley with an elastically mounted torsion balancer as hereinafter described.

The invention further consists in the combinations and elements more particularly set forth in the ensuing description, defined in the appended claims, and illustrated in the accompanying drawings, in which:

Figure 1 is an elevation of a crank shaft having a flywheel fixed at one end and a torsion balancer constructed in accordance with this invention mounted within a casing at the other end;

Figure 2 is a section on line 2—2 of Figure 3 showing the balancer having parts broken away;

Figure 3 is a sectional view through the balancer and casing taken on line 3—3 of Fig. 2.

In Figure 1 there is depicted an engine crank shaft having four journals and six throws. The journals are indicated from front to rear by the numerals 10, 11, 12 and 13. A relatively heavy flywheel 14 is fixed to the rear end of the shaft and a disc, gear, pulley or other transverse fixture or part keyed or otherwise non-rotatively bonded to the front end; the part at the front end may be, conveniently, a fan pulley 15, as shown, serving also in this instance as a means whereby to mount a balancer for minimizing torsional vibrations. The shaft is also shown as having counterweights 16 so disposed as to effect substantial dynamic balance. A balancer casing or cover plate 17, secured to the pulley 15 houses, with the pulley, a torsion balancing mass held elastically to a fixture rigid with respect to the shaft, said elastically mounted balancing mass having an adequate moment of inertia. To the front end 18 of the shaft, as indicated in Fig. 3, the fan pulley or other supporting part 15 is fixed, as by a key 19, or other means. The part 15 has on its front face an annular flange 20 leaving a cup-shaped cavity within the flange and an annular flat zone 21 perpendicular to the shaft axis outside of the flange. The space within the flange serves as a partial housing for the balancing mass to be presently described.

A fixture 23 to which in the illustrated embodiment the balancing mass is elastically connected is a generally cruciform member shown as bolted to the pulley, or other part 15 keyed to the shaft, by means of bolts 22. Said cruciform fixture has an open center and a rearward hub 24, the end of which fits against a shoulder 25 within the pulley or part 15. Between the front face of the pulley or part 15 and the cruciform fixture 23 there may be a spacer 26. A similar spacer 27 may be disposed on the front of the cruciform fixture; also outside of the spacer 27 there may be a gasket 28. The cruciform fixture 23, as shown in Fig. 3, is provided at diametrically opposite portions with outward flaring limbs 30 of dovetail form, the oppositely inclined opposed faces 31 of which constitute seats or abutments for helical springs 40 that sustain the balancer centrally about the axis of the shaft and substantially free from rubbing contact with the shaft or any part fixed thereto when the balancer is occupying its normal relation to the shaft and its fixtures.

The limbs 32 of the cruciform fixture, which are disposed substantially at right angles with respect to the spring-seat bearing limbs 30, are tapered outward, in form approximately reverse of that of limbs 30, in order to provide adequate space for springs 40 and permit them to be properly positioned to sustain the balancing mass with its center coincident with the center of the shaft.

The balancing mass consists of a ring-like body 33 having inwardly projecting segmental portions 34 intended to be disposed substantially adjacent the ends of limbs 32 of the cruciform fixture. The ends of said segmental portions 34 serve as spring seats or abutments 36 which, in the normal position of the assembled parts, are approximately parallel with the spring seats or abutments 31 on limbs 30. The space between the spring seats 31 and 36 provides room for the springs 40 which by engagement between said seats hold the balancing mass centered with respect to the shaft axis. In the illustrated embodiment four springs 40 are so arranged compressed between the abutments that the resultant of their elastic forces holds the balancing mass 33 centered about the axis of the shaft and substantially free from rubbing contact with the shaft and members rigid with it.

In order to keep dust and dirt from the space occupied by the balancer, a dished casing or cover plate 17 having an open center 37, is secured over the flange 20 and against a gasket 38 which rests between a peripheral flange on the cover plate and the annular surface 21 on the disc or pulley. The bolts 22 pass through the face of the cover plate and bind, between the front face of the pulley or other body 15 and the rear face of the cover plate, the cruciform fixture 23, spacers 26, 27 and gasket 28, thus providing a dust proof housing within which the balancer may vibrate.

The balancer is so proportioned and mounted that several thousandths of an inch space intervenes between its sides and periphery and the interior adjacent surfaces of the housing formed by the disc and cover plate as clearly indicated in Fig. 2. The flange 20 and cover plate 17 may serve to limit erratic movements of the balancer owing to varying or irregular movements of the vehicle on which it may be mounted. A small amount of grease or oil may be inserted in the casing to guard against metallic contact during erratic movements. A torsional balancer of the type described and shown does not require modification of crank and counterweight arrangement to receive it. It is therefore adapted to be applied to any form of crankshaft already in balance.

Although in the specific embodiment illustrated and described, four coil springs sustain the balancer mass centered about the axis of the shaft, it will be apparent that other forms and numbers of springs may be arranged so that the resultant of their forces may support and center a torsion balancer about the axis of a shaft or other member for the purpose of suppressing vibrations.

What I claim is:

1. In means for controlling torsional vibrations, the combination with a torsionally elastic shaft, of a balancer comprising a mass balanced and having a moment of inertia about the axis of said shaft, and spring means bearing upon a part rigid with the shaft centering and sustaining the mass free of contact with the shaft.

2. Means as defined in claim 1, wherein a plurality of springs are arranged to exert elastic forces upon the mass and shaft in such directions that the resultant of the elastic forces centers the mass with respect to the shaft.

3. Means as defined in claim 1, in which the mass is centered with respect to the shaft and held out of contact therewith by means of springs arranged in opposing pairs, so that the resultant of the elastic forces centers the mass with respect to the shaft.

4. In means for controlling torsional vibrations the combination of a torsionally elastic shaft having a fixture provided with radially extending limbs each having oppositely facing spring seats, a balancing mass surrounding the shaft and having a moment of inertia about the axis thereof, said balancing mass having spring seats opposed to those on said fixture, and coil springs between the spring seats on the balancer and the opposing spring seats on the fixture sustaining said mass centered with respect to the shaft axis.

5. The combination of an engine crank shaft having a flywheel fixed at one end and a power transmission wheel fixed at the other end thereof, of a balancer elastically connected to the power transmission wheel, and sustained by the elastic connections out of bearing contact with the shaft or parts rigid therewith.

6. Means as defined in claim 5 in which the power transmission wheel has one face recessed to constitute a portion of a housing for the balancer, and an annular housing member secured to the power transmission wheel completes the housing.

In testimony whereof I affix my signature.

BENJAMIN H. ANIBAL.